United States Patent

Toni et al.

Patent Number: 5,558,919
Date of Patent: Sep. 24, 1996

[54] DUCT COVER FOR DIRECTING A FLUID THERETHROUGH

[75] Inventors: Darryl M. Toni, Madison; Peter L. Grant, Hamden; Craig F. Johnson, Stratford; Steven R. Hayse, Naugatuck; William V. Forster, Seymour; Kenneth Nowak, Easton; Larry J. Osiecki, Oxford, all of Conn.

[73] Assignee: United Technologies Corporation, Hartford, Conn.

[21] Appl. No.: 124,095

[22] Filed: Sep. 20, 1993

[51] Int. Cl.$^6$ .................................................. B32B 3/12
[52] U.S. Cl. ......................... 428/116; 428/158; 428/288
[58] Field of Search .................................. 428/116, 118, 428/158, 288

[56] References Cited

U.S. PATENT DOCUMENTS

| | | | |
|---|---|---|---|
| 2,477,852 | 8/1949 | Bacon | 428/116 |
| 3,317,074 | 5/1967 | Barker, Jr. et al. | 428/117 X |
| 3,487,410 | 12/1969 | Barnett et al. | 342/2 |
| 3,509,568 | 4/1970 | Manning et al. | 342/2 |
| 3,519,024 | 7/1970 | Johnson et al. | 138/41 |
| 3,695,968 | 10/1972 | Morrison | 428/117 X |
| 4,162,344 | 7/1979 | Rones | 428/288 X |
| 4,258,823 | 3/1981 | Ganz et al. | 181/214 |
| 4,335,174 | 6/1982 | Belko | 428/73 |
| 4,562,111 | 12/1985 | Ogawa | 428/288 X |
| 5,016,015 | 5/1991 | Novak et al. | 428/116 X |
| 5,034,256 | 7/1991 | Santiso et al. | 428/73 |
| 5,249,462 | 10/1993 | Bonne | 428/116 X |

FOREIGN PATENT DOCUMENTS

| | | |
|---|---|---|
| 0563509 | 1/1993 | European Pat. Off. . |
| 888585 | 12/1943 | France . |
| 2606703 | 5/1988 | France . |
| 2658116 | 8/1991 | France . |
| 1525969 | 7/1969 | Germany . |
| 3419292 | 11/1985 | Germany . |
| 4012334 | 10/1991 | Germany . |
| 2171989 | 9/1986 | United Kingdom . |
| WO88/4479 | 6/1988 | WIPO . |

OTHER PUBLICATIONS

Honeycomb in Air Directionalizing Applications TSB 102, HEXCEL Honeycomb, Copyright 1986, 11 pages.

Primary Examiner—Henry F. Epstein
Attorney, Agent, or Firm—Terrance J. Radke; Robert E. Cannuscio

[57] ABSTRACT

A duct cover for use with a duct within a vehicle, the duct cover operative for directing a fluid flow. The duct cover being further operative for minimizing the entrance of foreign object debris into the duct. The duct cover has a flow directing honeycomb portion for conducting the passing fluid flow in a preferred direction. The flow directing honeycomb comprises an array of continuous, polygon shaped open cells which are biased with respect to the initial fluid flow direction. The periphery of the flow directing honeycomb is rigidized to stiffen the same for minimizing the displacements thereof. The rigidity is provided by a framing member comprising upper and lower skin structures affixed to a core material. The framing member is preferably adhesively bonded to the flow directing honeycomb by means of a foaming adhesive and a barrier member. The barrier member is operative for minimizing the expansion of the foaming adhesive into the open cells of the honeycomb. In order to improve the low observability characteristics of the structure, the cells of the flow directing honeycomb are preferably coated with a radar absorbent material, such as carbon, which acts to minimize the amount of electromagnetic energy that is reflected therefrom.

36 Claims, 8 Drawing Sheets

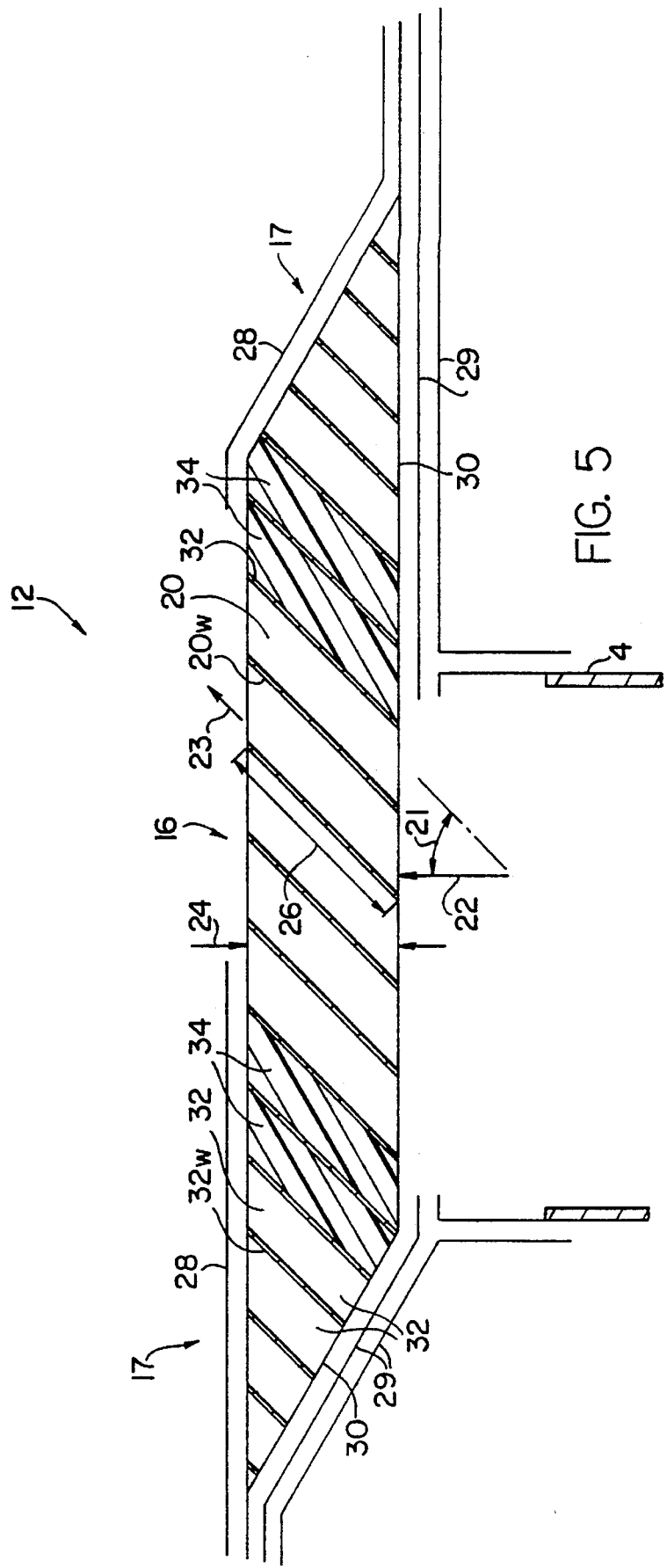

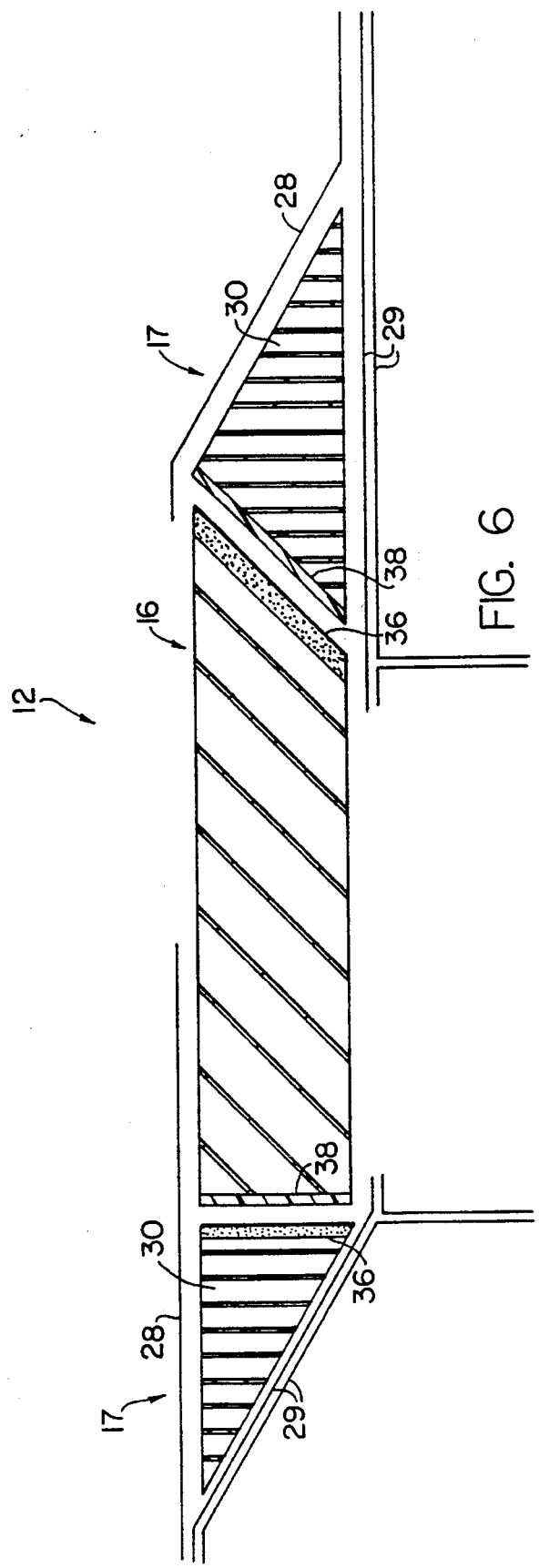

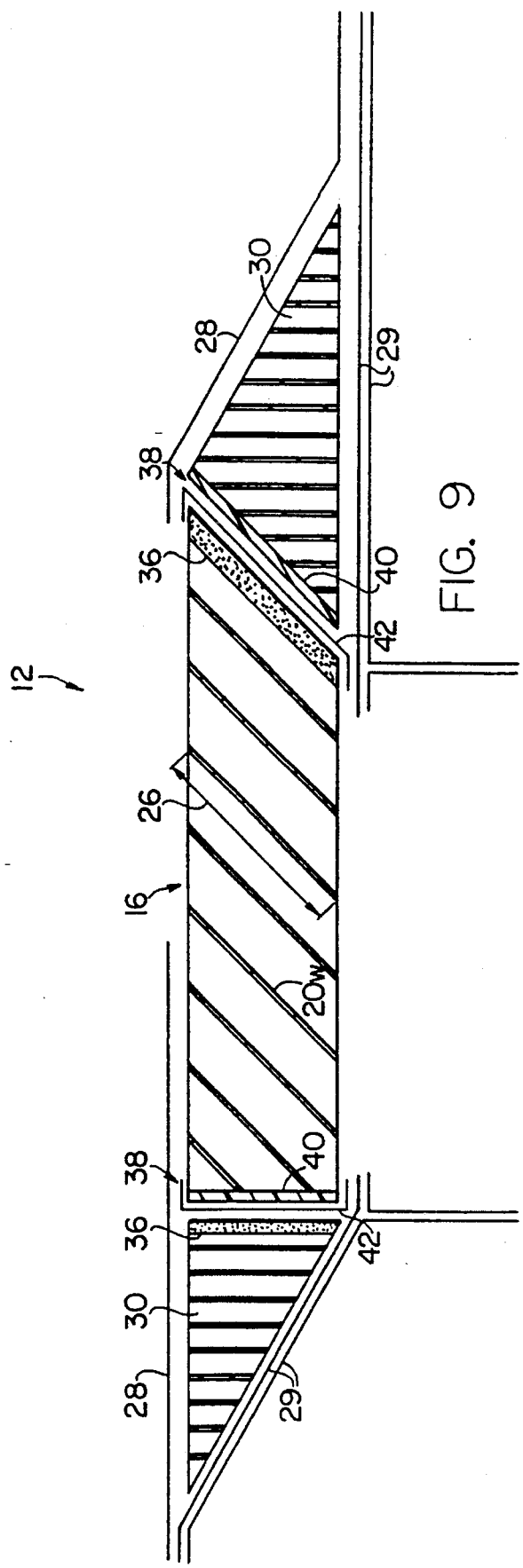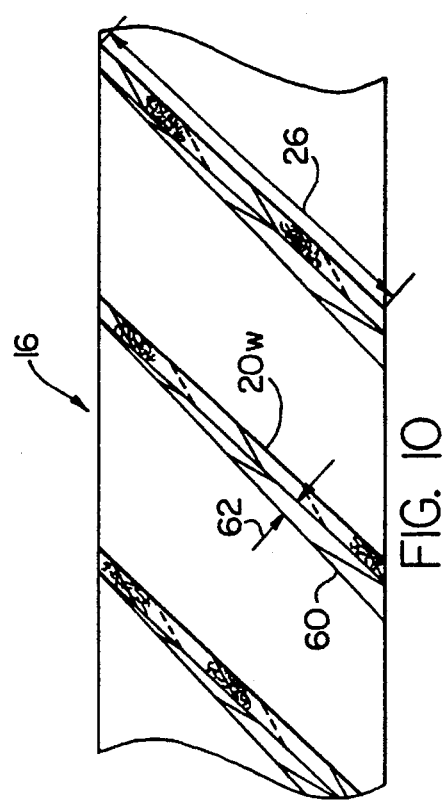

DUCT COVER FOR DIRECTING A FLUID THERETHROUGH

The Government has rights in the invention pursuant to a contract awarded by the Department of the Army.

TECHNICAL FIELD

The present invention relates to fluid ducts in vehicles such as aircraft and, more particularly, to an improved duct cover which provides directional control over the flow of a fluid passing through the duct cover while minimizing a direct line of sight of any components contained internal to the vehicle.

BACKGROUND OF THE INVENTION

Vehicles, such as fixed and rotary wing aircraft, have a variety of inlet and exhaust apertures formed on the outer skin of the fuselage structure for intaking and expelling fluids. These apertures are typically configured to maximize the amount of fluid flow that is admitted into or expelled from the interior of the vehicle, while minimizing head-loss or back-pressure. The shape, size, and location of the aperture all play an important role in determining the fluid flow efficiency.

For the purpose of simplification, the vehicle referred to herein is an rotorcraft, but it should be understood that the invention can be employed on any vehicle, e.g., automotive, other types of aircraft, etc.

The apertures are generally used in combination with a duct which operates to channel or funnel the fluid from or to a specific area within the aircraft. A frequent use for such apertures is to exhaust hot gases generated by one or more internal mechanisms, e.g., oil coolers.

One of the most efficient ways for channeling a fluid flow into or out of an aircraft is by locating the aperture in direct line of sight of the internal component and connecting the two utilizing a straight duct. For example, an oil cooler would be located directly forward of an exhaust aperture so as to permit the exhaust gases to flow directly out of the aircraft. Such a design requires the least amount of ducting for channeling the fluid. Furthermore, the straight shape of the ducting minimizes the likelihood of the flow becoming disrupted, i.e., turbulent.

It is oftentimes desirable, however, to configure the aperture to channel the fluid in a direction other than that of the initial flow. For example, the engine exhaust aperture in a helicopter with a ducted anti-torque system is designed so as to direct the exhausting gases to the side of the aircraft in order to provide a thrust for reacting the torque induced on the aircraft by the main rotor system. Handling qualities may also influence the design of the duct. For example, exhaust gases may be directed away from areas on the aircraft where ground personnel are likely to be performing maintenance. Furthermore, the aircraft aerodynamics may affect the desired direction of intake or exhaust, e.g., the exhausting of a gas may be directed away from the rotor downwash.

One common way for providing directional control of the intake and exhaust of fluids is to angularly orient the duct with respect to the outer skin such that the walls of the duct direct the fluid in the preferred direction. There are two primary deficiencies with this type of arrangement. Firstly, the area within the aircraft wherein the duct is to be mounted may be limited in size and, therefore, the size and shape of the duct may be so limited. Secondly, the additional duct wall structure needed to angle the duct in the preferred direction increases the overall weight of the duct.

Another method for directing fluid flow involves the mounting of guide vanes within the aperture as depicted in FIG. 1. The guide vanes are generally small airfoil-shaped structures which are disposed within the passing flow of fluid and oriented so as to direct the passing flow of fluid in the preferred direction. The vanes are typically affixed to the duct wall or to the structure surrounding the aperture. While guide vanes provide sufficient directional control over the fluid flow they require additional structural support in order to maintain their desired shape and orientation. This results in a relatively heavy duct structure.

Track and scan radar tracking systems utilize a transmitter to emit a radar signal, i.e., electromagnetic energy, toward an aircraft and a receiver to sense reflected electromagnetic energy. The electromagnetic energy returned to the radar source represents the aircrafts radar signature. The stronger the radar signature of the aircraft, the more likely it is that the aircraft can be detected and tracked by the radar source. Many of the internal components, e.g., compressors, transmissions, oil coolers, etc., of modern military aircraft are manufactured from metallic materials such as steel which tend to reflect electromagnetic energy.

To reduce the aircraft's radar signature, internal metal components are, where possible, located out of direct-line-of-sight of an aperture as shown in FIG. 2. Shaped-ducting is utilized to direct the fluid flow to or from the component. This type of design minimizes the likelihood of a returned signal inasmuch as the signal must reflect off the duct walls to reach the internal component, then reflect back to exit through the aperture. An example of such a shaped duct wall is described in U.S. Pat. No. 5,016,015, entitled AIRCRAFT CONSTRUCTION. One deficiency with a shaped duct configuration is that a substantial amount of weight is added to the aircraft.

Another method for reducing the radar signal return is to coat the duct wall surface with a radar absorbent material (RAM). The RAM coating acts to absorb the radar energy as it impinges on the duct wall. Thus, a shorter length duct wall can be used while maintaining a low radar signature. The RAM coating, however, increases the weight of the overall duct structure inasmuch as the entire duct must be coated.

In order to prevent foreign object debris (FOD) from entering an exhaust or intake aperture, wire screens are oftentimes affixed thereto. While the screens provide an effective means for preventing relatively large pieces of FOD from entering the aperture, the screens do not provide a means for directing the fluid flow. Furthermore, the screens may also be coated with RAM to reduce the radar return that would otherwise be generated.

A need, therefore, exists for an improved duct cover which provides directional control over a fluid flow passing therethrough, while minimizing a direct-line-of-sight of any structure contained within the vehicle.

SUMMARY OF THE INVENTION

An object of the present invention is to provide a duct cover for use in combination with a duct within a vehicle wherein the duct cover is operative in directing a fluid flow passing therethrough.

Another object of the present invention is to provide a duct cover for use in combination with a duct within a vehicle wherein the duct cover includes a fluid flow directing portion and a rigidizing portion.

Yet another object of the present invention is to provide a duct cover for use in combination with a duct within a vehicle wherein the fluid flow directing portion includes angled or biased honeycomb operative in directing a fluid flow therethrough.

Still another object of the present invention is to provide a duct cover for use in combination with a duct within a vehicle wherein the duct cover includes an adhesive bond between a honeycomb core material and a flow directing honeycomb.

Yet still another object of the present invention is to provide a duct cover for use in combination with a duct within a vehicle wherein the duct cover includes a radar absorbent material disposed on a flow directing honeycomb.

These and other objects are achieved through the duct cover of the present invention which includes a flow directing honeycomb which is operative to conduct the flow of passing gases in a preferred direction. The flow directing honeycomb is rigidized about its periphery to stiffen the same for minimizing the displacements thereof. The rigidizing of the periphery furthermore provides an enhanced mounting point for attaching the duct cover to the surrounding structure.

The flow directing honeycomb comprises an array of continuous, polygon shaped open cells defined by an associated plurality of cell walls. The directional control over the passing fluid flow is provided by angling or biasing the honeycomb cells with respect to the initial flow direction of the fluid prior to entering the flow directing honeycomb. The thickness of the flow directing honeycomb is designed so as to provide a cell having a length sufficient for effecting a change in the fluid flow from the initial direction to the final direction.

The periphery of the flow directing honeycomb is stiffened by means of a rigidizing portion formed thereabout. The rigidizing portion comprises outer and inner skin structures disposed over and bonded to a core material. The outer and inner skin structures and the core material provide stiffness to the flow directing honeycomb which, when unsupported is poorly suited for reacting bending loads. To minimize the weight of the duct cover while providing sufficient rigidity, it is preferable to utilize a core material made from honeycomb. Further rigidity may be provided by filling a plurality of the cells of the honeycomb core material between the outer and inner skin structures with a stiffening material which, when cured, provides a rigid attachment between the outer and inner skin structures. The combination of the outer and inner skin structures and the stiffening material results in a triangular shaped framing member.

The core material of the rigidizing portion may be formed integral with the flow directing honeycomb. Alternately, the core material of the rigidizing portion may be adhesively bonded to the flow directing honeycomb. The adhesive bond comprises a foaming adhesive layer and a barrier member. Foaming adhesive is designed to expand when exposed to an elevated temperature. As the foaming adhesive layer expands, it fills all adjacent voids. The barrier member is utilized to minimize the expansion of the foaming adhesive layer into the open cells of the flow directing honeycomb and the core material.

The barrier member comprises a film adhesive layer and, if additional stiffness is desired, at least one ply of fiber reinforced resin matrix composite material, such as graphite, fiberglass, quartz, or an aromatic polyamide material, preimpregnated with a resin. The composite material acts with the film adhesive layer to provide a barrier for minimizing the expansion of the foaming adhesive into the open cells of the flow directing honeycomb and the core material. Furthermore, the composite material increases the stiffness of the flow directing honeycomb by providing a mechanical link/strut between the outer and inner skin structures. The combination of the outer and inner skin structures and the composite material results in a rigid framing member of triangular cross section. Additionally, the composite material assists in transferring the loads which are applied to the duct cover.

In order to further improve the low observability performance of the structure, it is preferable to treat or coat the flow directing honeycomb with a radar absorbent material (RAM) such as carbon. The RAM coating increases the amount of radar energy which is absorbed by the structure, thus minimizing the energy which is reflected. The thickness or constituent electrical properties of RAM coating is varied along the length of the cell walls so as to change the overall resistance of the structure. The change in resistance effectively results in an attenuation of passing electromagnetic energy, thereby reducing the magnitude of the radar return.

In further accord with the present invention, duct cover may be fabricated by placing the plies, which comprise the outer skin structure, on a mold which has a contour that defines the external surface of the duct cover. Appropriately angled honeycomb is cut to the desired size for use as the flow directing honeycomb. A RAM coating is disposed on the cell walls of the flow directing honeycomb so as to increase the radar energy which is absorbed thereby. The core material is cut to an appropriate dimension for use in rigidizing the periphery of the flow directing honeycomb.

Still in further accord with the present invention, an adhesive bond is formed between the core material and the flow directing honeycomb. The adhesive bond comprises a foaming adhesive layer and a barrier member, the barrier member being placed adjacent the open cells of the flow directing honeycomb and the core material for preventing the foaming adhesive layer from expanding into the open cells. The barrier member is formed from a layer of film adhesive and, if additional stiffness is desired, a ply of composite material.

The flow directing honeycomb and the core material are placed in the mold, over the outer skin structure. The composite material plies which form the inner skin structure are then disposed over the core material about the periphery of the exposed flow directing honeycomb. A mandrel, for use in forming the duct mounting member, is placed on top of the flow directing honeycomb and the inner skin structures are wrapped about the mandrel. A vacuum bag is disposed over the entire assembly and a vacuum is drawn. The assembly is then cured by exposing the same to an elevated temperature and pressure. After curing, the duct cover is removed from the mold and is attached to the exhaust duct.

The foregoing and other objects, features and advantages of the present invention will become more apparent in light of the following derailed description of exemplary embodiments thereof, as illustrated in the accompanying drawings.

BRIEF DESCRIPTION OF THE DRAWINGS

A more complete understanding of the present invention and the attendant features and advantages thereof may be had by reference to the following detailed description of the invention when considered in conjunction with the accompanying drawings wherein:

FIG. 5 is a detailed cross sectional view of one embodiment of the invention;

FIG. 6 is a detailed cross sectional view of a second embodiment of the invention;

FIGS. 8a and 7b are examples of another, preferred, bonding method in accordance with the present invention;

FIG. 9 is a detailed cross sectional view of the preferred embodiment of the present invention;

FIG. 10 is a partial cross sectional view of the flow directing honeycomb of FIG. 9 illustrating the radar absorbent material which is disposed on the cell walls.

DETAILED DESCRIPTION OF THE PREFERRED EMBODIMENT

Figure 1:
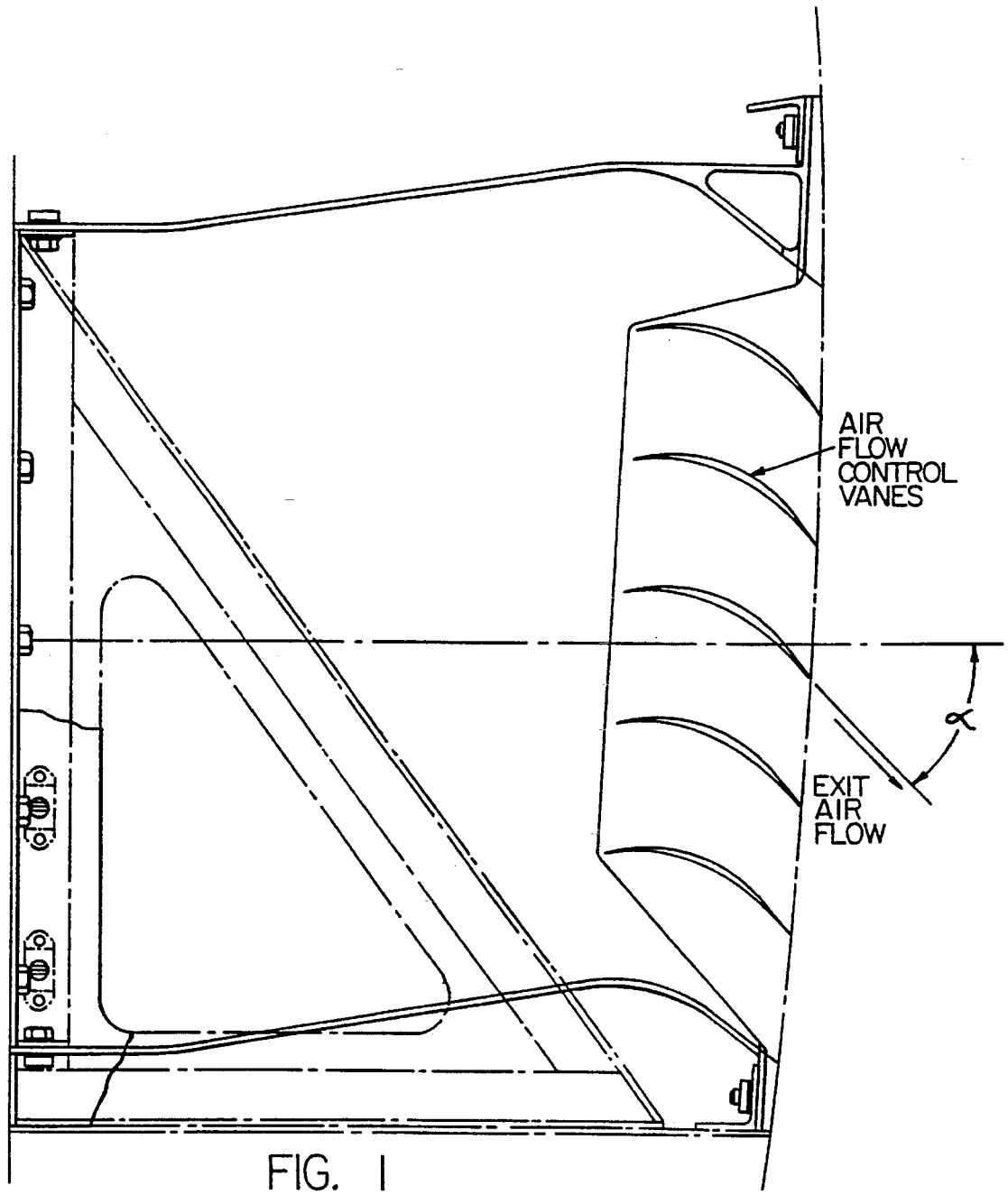
FIG. 1 is a cross sectional view of a prior art exhaust duct for an internally mounted component with directional guide vanes mounted therein.
Figure 2:
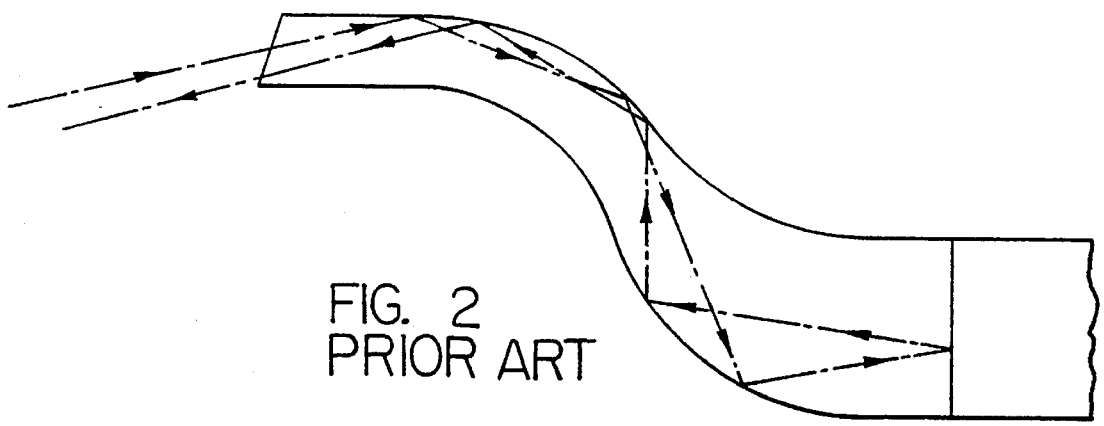
FIG. 2 is a cross sectional view of a prior art inlet duct for an internally mounted component which minimizes the radar return generated therefrom.
Figure 3:
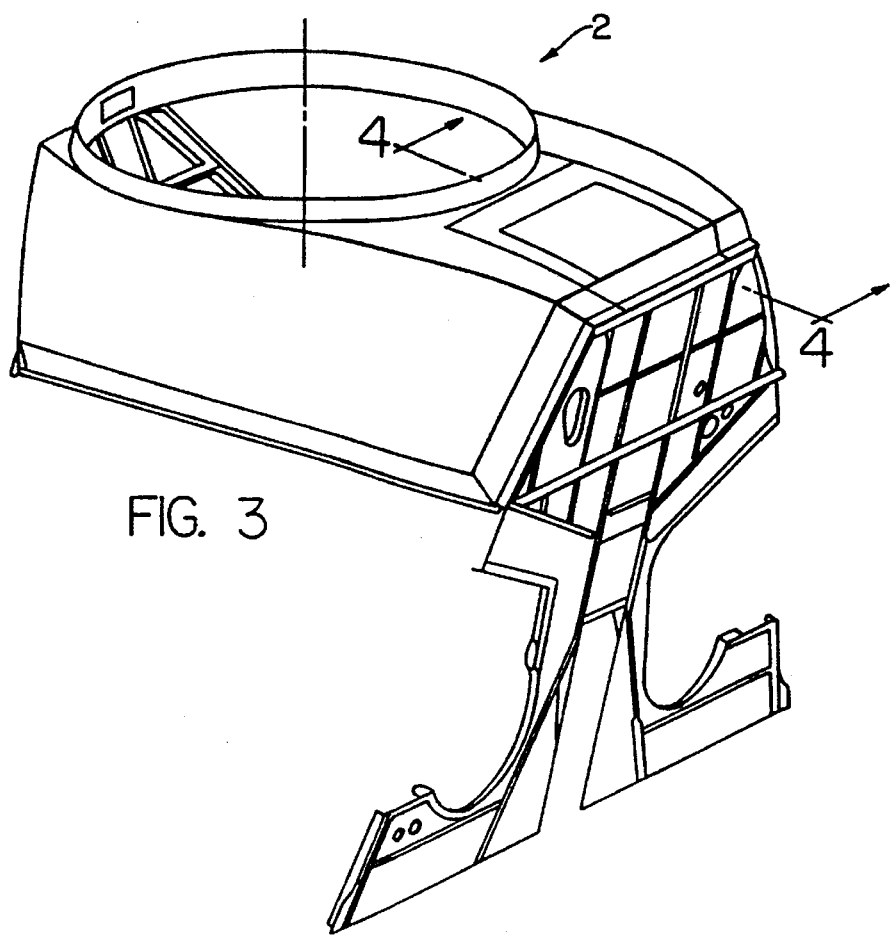
FIG. 3 illustrates, in perspective view, the ducted cover of the present invention incorporated in a helicopter main rotor pylon.
Figure 4:
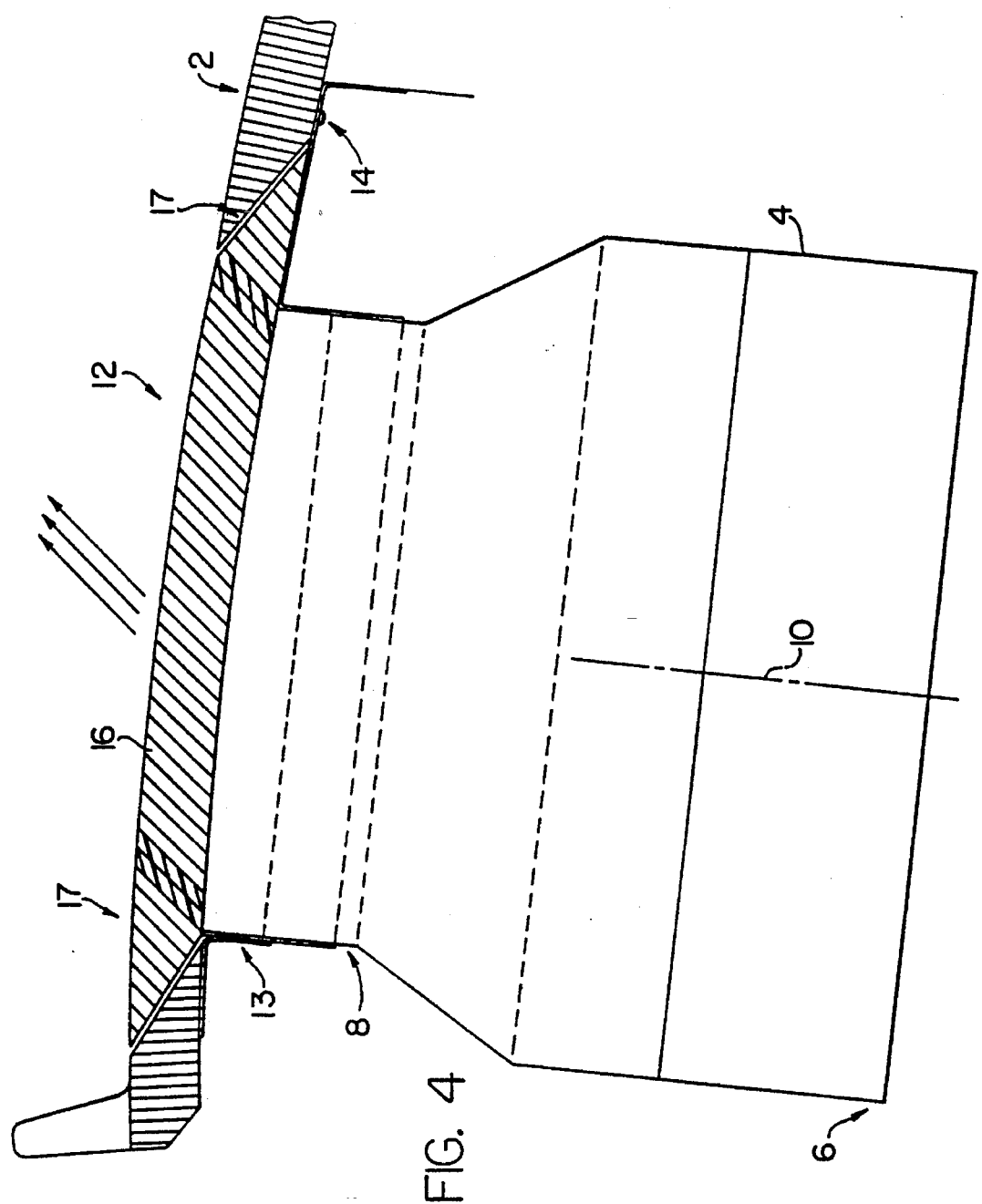
FIG. 4 is a cross sectional view of the present invention along line 4—4 in FIG. 3.

Referring now to the drawings wherein like reference numerals illustrate corresponding or similar structures, FIG. 3 shows one embodiment of the present invention mounted in a helicopter main rotor pylon 2. The pylon is disposed about the main rotor drive shaft of a helicopter aircraft. Referring now to FIG. 4, the pylon has incorporated therein a transmission oil cooler assembly consisting of an oil cooler unit (not shown) and an exhaust duct 4. The oil cooler unit, which is used to cool the transmission oil, generates a significant amount of exhaust gases which must be evacuated from the main rotor pylon. The exhaust duct 4 has one end 6 attached to the oil cooler unit and the opposite end 8 extends to an aperture formed in the main rotor pylon 2. The exhaust duct provides a conduit to the exterior of the aircraft through which the oil cooler exhaust gases flow. The flow of the exhaust gases generally follows a path which is parallel to the centerline 10 of the duct 4. A duct cover 12 is disposed over and affixed to the exterior end 8 of the exhaust duct 4 by way of a duct mounting member 13. The duct cover 12 is, furthermore, mounted to the main rotor pylon 2 by means of internal attachments 14 such as screws or bolts. The duct cover 12 comprises a flow directing honeycomb 16 which is operative to conduct the flow of passing gases in a preferred direction. The flow directing honeycomb 16 is rigidized about its periphery 17 to stiffen the same for minimizing the displacements thereof. The rigidizing of the periphery furthermore provides an enhanced mounting point for attaching the duct cover 12 to the surrounding structure.

One embodiment of the duct cover 12 is illustrated in more detail in FIG. 5. The flow directing honeycomb 16 of the duct cover is shown located over the duct 4. The flow directing honeycomb comprises an array of continuous, polygon shaped open cells 20 defined by an associated plurality of cell walls $20_W$. The directional control over the passing fluid flow is provided by angling or biasing 21 the honeycomb cells 20 with respect to the initial flow direction 22 of the fluid prior to entering the flow directing honeycomb 16. In the present invention, the location of the duct cover 12, which is in close proximity to the main rotor blades (not shown), is one of several factors used in determining the degree of bias 21 of the cells 20. Additional factors in choosing the preferred bias 21 are the degree of back pressure that the bias 21 generates, e.g., zero degrees of bias produces the least amount of back pressure, the presumed direction of travel of electromagnetic energy, the location of internal components which are likely to reflect any impinging electromagnetic energy, and the preferred exhaust flow direction. A bias 21 range between about 20 degrees and about 70 degrees provides adequate directional control over the passing fluid. In the preferred embodiment, the cells 20 have a bias 21 of forty-five degrees with respect to the fluid flow initial direction 22. Moreover, the cells 20 are biased in the aft direction for the purpose of conducting the exhaust gases toward the rear portion of the aircraft in such a manner so as not to disturb the airstream over the aircraft. The thickness 24 of the flow directing honeycomb 16 is designed so as to provide a cell 20 having a length 26 sufficient for effecting a change in the fluid flow from the initial direction 22 to the final direction 23. The minimal cell length 26 sufficient for effecting a change in the fluid flow direction is approximately 0.25 inches. In the preferred embodiment, the cell length 26 is approximately 1.18 inches.

The periphery of the flow directing honeycomb 16 is stiffened by means of a rigidizing portion 17 formed thereabout. The rigidizing portion comprises outer and inner skin structures 28,29 disposed over and bonded to a core material 30. The outer and inner skin structures 28,29 and the core material 30 provide stiffness to the flow directing honeycomb 16 which, when unsupported is poorly suited for reacting bending loads. To minimize the weight of the duct cover while providing sufficient rigidity, it is preferable to utilize a core material made from honeycomb which comprises an array of polygon shaped cells 32 defined by an associated plurality of cell walls $32_W$. In the embodiment shown in FIG. 5, the honeycomb core material 30 is an integral extension of the flow directing honeycomb 16. Further rigidity is provided by filling a plurality of the cells 32 of the honeycomb core material 30 between the outer and inner skin structures 28,29 with a stiffening material 34 which, when cured, provides a rigid attachment between the outer and inner skin structures 28,29. The combination of the outer and inner skin structures 28,29 and the stiffening material 34 results in a triangular framing member. It is preferable to utilize an epoxy resin or a high density syntactic foam, such as EPOCAST (EPOCAST is a trademark of Ciba-Furane of Los Angeles, Calif.), as the stiffening material 34, and to fill at least two rows of cells 32 of the core material 30 in an annular pattern about the periphery of the flow directing honeycomb 16. Furthermore, in the embodiment shown, the flow directing honeycomb 16 and the core material 30 are made from a fiberglass material. Fiberglass is the preferred material inasmuch as fiberglass is relatively light in weight as compared to metallic material such as aluminum. Additionally, fiberglass is environmentally stable, i.e., absorbs relatively little moisture as compared to a phenolic resin material such as NOMEX® (NOMEX is a trademark of E. I. Du Pont De Nemours and Company, Wilmington, Del.). Furthermore, fiberglass is a dielectric material, i.e., it is not a conductor of electricity, and, therefore, is a desirable material to use in a low observable structure, inasmuch as only a minimal amount of electromagnetic energy will be reflected therefrom. Moreover, it is preferable to further process the fiberglass honeycomb so as to increase its ability to attenuate the passing electromagnetic energy. The preferred method for processing the honeycomb is to coat the same with a radar absorbent material and is described in more detail hereinbelow. While fiberglass is the preferred honeycomb material, it should be understood that metallic material can be used when weight and low observability are not critical design criteria. Additionally, if the temperature of the fluid flow is excessive, ceramic honeycomb material can be used in place of fiberglass material. The flow directing honeycomb 16 is preferably about 1.2 inches thick with a density of 4.5 pounds per cubic foot. Higher density honeycomb, which is indicative of smaller cell sizes, provides additional stiffness but results in higher weight penalties. It is preferable to utilize a higher density honeycomb than what is structurally required so as to provide increased damage tolerance capability against low intensity impacts. Additionally, the smaller cells assist in minimizing the entrance of foreign object debris (FOD) into the duct.

In order to achieve a strong, lightweight structure, it is preferable to fabricate the outer and inner skin structures 28,29 from a high strength, fiber reinforced resin matrix composite material such as graphite, fiberglass, quartz, or an aromatic polyamide material such as KEVLAR® (KEVLAR is a trademark of E. I. DuPont De Nemours), preimpregnated with a resin, preferably an epoxy. If low radar signature is an important design objective then the preferred material is a dielectric material, such as quartz/epoxy, KEVLAR/epoxy, or fiberglass/epoxy, which minimizes the reflection of electromagnetic energy. In the preferred embodiment two plies of woven KEVLAR/epoxy material are used on both the outer and inner skin structures 28,29. KEVLAR/epoxy material is chosen over quartz/epoxy and fiberglass/epoxy materials inasmuch as KEVLAR/epoxy material is lighter and provides better ballistic protection.

Figure 7A:
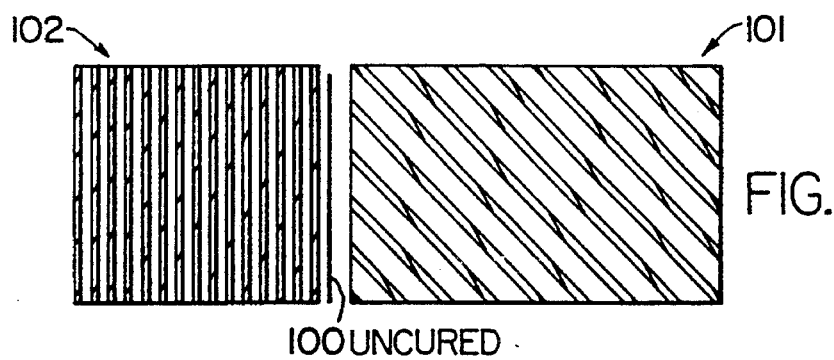
FIGS. 7a and 7b are examples of one bonding method in accordance with the present invention.
Figure 7B:
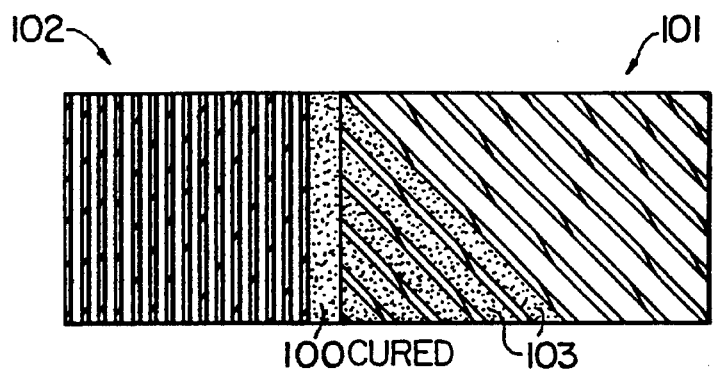
Figure 8A:
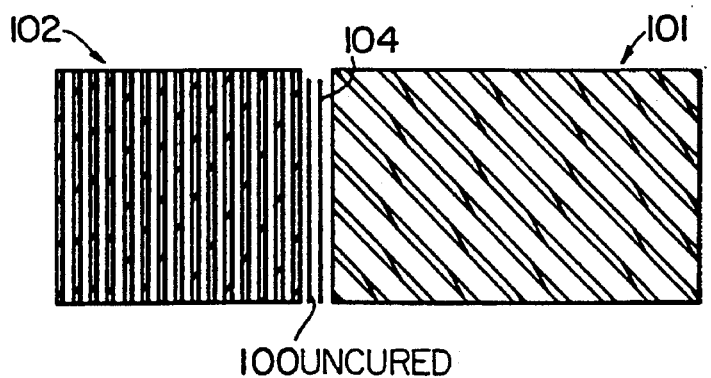
Figure 8B:
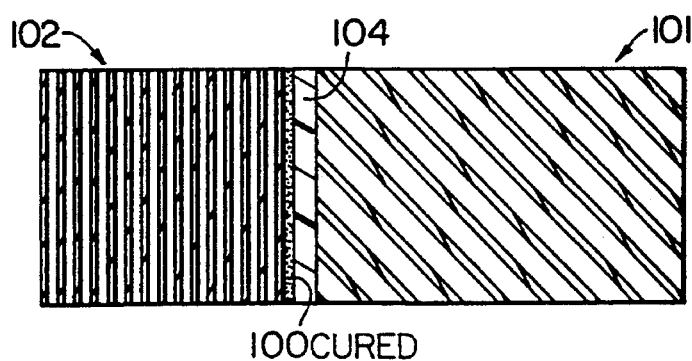

An alternate duct cover design is depicted in FIG. 6, wherein the core material 30 of the rigidizing 17 portion of the duct cover is adhesively bonded to the flow directing honeycomb 16. The adhesive bond comprises a foaming adhesive layer 36, such as FM-410 manufactured by American Cyanamid Company of Havre DeGrace, Md., approximately 0.050 inches thick, and a barrier member 38. Foaming adhesive is designed to expand when exposed to an elevated temperature. As the foaming adhesive layer expands, it fills all adjacent voids. FIGS. 7a and 7b show the effect of a foaming adhesive layer 100 on bias cut honeycomb. FIG. 7a is a cross sectional view showing bias cut honeycomb 101 adjacent to unbiased honeycomb 102. A layer of uncured foaming adhesive 100 is disposed between the two honeycombs 101,102. FIG. 7b is a cross sectional view of the structure showing the expanded foaming adhesive layer 100 after being exposed to an elevated temperature. The expanded foaming adhesive layer 100 fills several cells 103 of the bias cut honeycomb 101. While this provides additional stiffness to the bias cut honeycomb 101, it also results in a reduction in the mechanical properties of the foaming adhesive layer 100 and adds a substantial amount of weight. The expanded foaming adhesive layer 100 also has an adverse impact on the low observability performance of the structure. Referring now to FIGS. 8a and 8b in order to minimize the expansion of the foaming adhesive layer 100 during curing, a barrier member 104 is disposed between the uncured foaming adhesive layer 100 and the bias cut honeycomb 101. The barrier member 104 minimizes the expansion of the foaming adhesive layer $100_{cured}$ into the open cells of the bias cut honeycomb 101, thereby yielding a lighter panel with improved low observability characteristics.

Referring again to FIG. 6, the barrier member 38 is utilized to prevent the foaming adhesive layer 36 from entering the open cells of the flow directing honeycomb 16 and the core material 30. In the embodiment shown, the barrier member is a layer of structural film adhesive such as M1146 manufactured by BASF of Anaheim, Calif.

An alternate and preferable design configuration for rigidizing the duct cover while providing a barrier member 38 is shown in FIG. 9. In this embodiment, the barrier member 38 comprises a film adhesive layer 40 and at least one ply of fiber reinforced resin matrix composite material 42, such as graphite, fiberglass, quartz, or an aromatic polyamide material, preimpregnated with a resin, preferably an epoxy. The composite material 42 further stiffens the flow directing honeycomb 16 by providing a mechanical link/strut between the outer and inner skin structures 28,29. The combination of the outer and inner skin structures 28,29 and the composite material 42 results in a rigid framing member of triangular cross section. Furthermore, the composite material 42 assists in transferring the loads which are applied to the duct cover 12. Additionally, the composite material 42 acting with the film adhesive layer 40 provides a barrier for minimizing the expansion of the foaming adhesive into the open cells of the flow directing honeycomb 16 and the core material 30. In order to minimize the reflection of electromagnetic energy, it is preferable to use fibers made from either aromatic polyamide, quartz, or fiberglass material in the composite material 42. In the preferred embodiment, the composite material 42 is made from KEVLAR/epoxy material which provides a lightweight, ballistically tolerant structure. The resulting configuration is a relatively stiff duct cover which provides directional control over the flow of the exhaust gases while minimizing the likelihood of damage from low impacts. Additional stiffness may be provided by utilizing a honeycomb core material 30 which has a higher density than the flow directing honeycomb 16, however, in the preferred embodiment, a honeycomb core material 30 with a lighter density than the flow directing honeycomb 16 was utilized.

Referring to FIG. 10, in order to further improve the low observability performance of the structure, it is preferable to treat or coat the flow directing honeycomb 16 with a radar absorbent material (RAM) 60, such as carbon. The RAM coating 60 increases the amount of radar energy which is absorbed by the structure, thus minimizing the energy which is reflected. In the preferred embodiment, the thickness 62 or constituent electrical properties of RAM coating 60 that is disposed on the flow directing honeycomb 16 varies along the length 26 of the cell walls $20_W$. The varying or grading of the RAM coating 60 provides a change in resistance for reducing the reflection of electromagnetic energy. For example, the portion of the cell wall closest to the electromagnetic energy source has a minimal amount of RAM coating 60 disposed thereon whereas the portion of the cell wall furthest from the electromagnetic energy source has a large amount of RAM coating 60 disposed thereon with the remaining cell wall graded accordingly. The attenuation of electromagnetic energy will, therefore, vary along the length 26 of the cell wall $20_W$ thus yielding a reduced magnitude radar return. While the figure depicts a linear variation in thickness, any suitable variation may be used which achieves the desired attenuation.

The preferred embodiment of the duct cover described hereinabove may be fabricated by first curing the two plies of a fiber reinforced resin matrix composite material 28, such as woven KEVLAR/epoxy material. This ensures that the external surface of the structure will remain relatively smooth when the outer skin structure 28 is cured with the core material 30. If external surface quality is not critical to the design, than the outer skin structure 28 may be co-cured with the core material 30 and the inner skin structure 29, however, the resulting skin structures 28,29 may experience some dimpling during the curing process. The composite plies are placed on a mold which has a contour that defines the external surface of the duct cover 12. A vacuum bag is disposed thereon and a vacuum is drawn on the composite plies. The assembly is exposed to an elevated temperature of about 350 degrees Fahrenheit and a pressure of about 100 psi for approximately 2 hours to cure the composite plies. The cured outer skin structure 28 is then trimmed to the appropriate dimensions.

Appropriately angled honeycomb is cut to the desired size for use as the flow directing honeycomb 16. In the preferred embodiment, the cells 20 of the flow directing honeycomb 16 are coated with RAM. It is well-known to those skilled in the art of low observable structures to apply a RAM coating to a honeycomb structure and any of a number of well-known methods can be utilized to coat the flow directing honeycomb. Stabilization of the edges of the flow directing honeycomb 16 is achieved by curing a layer of foam adhesive thereon. In order to prevent the foaming adhesive from expanding into the open cells of the flow directing honeycomb 16 a layer of film adhesive, such as FM-410, is utilized. The flow directing honeycomb 16, with the foaming adhesive layer disposed thereon, is vacuum bagged and cured for two hours at 260 degrees Fahrenheit.

The core material 30 is cut to an appropriate dimension for use in rigidizing the periphery of the flow directing honeycomb 16. Preferably, ⅛ inch cell NOMEX honeycomb core with a density of 4.0 pounds per cubic foot is utilized. The core material 30, flow directing honeycomb 16 and the cured outer skin structure 28 are wiped down with alcohol then wrapped in clean brown craft paper and placed in an oven to dry at 150 degrees Fahrenheit for two hours.

Figure 11:
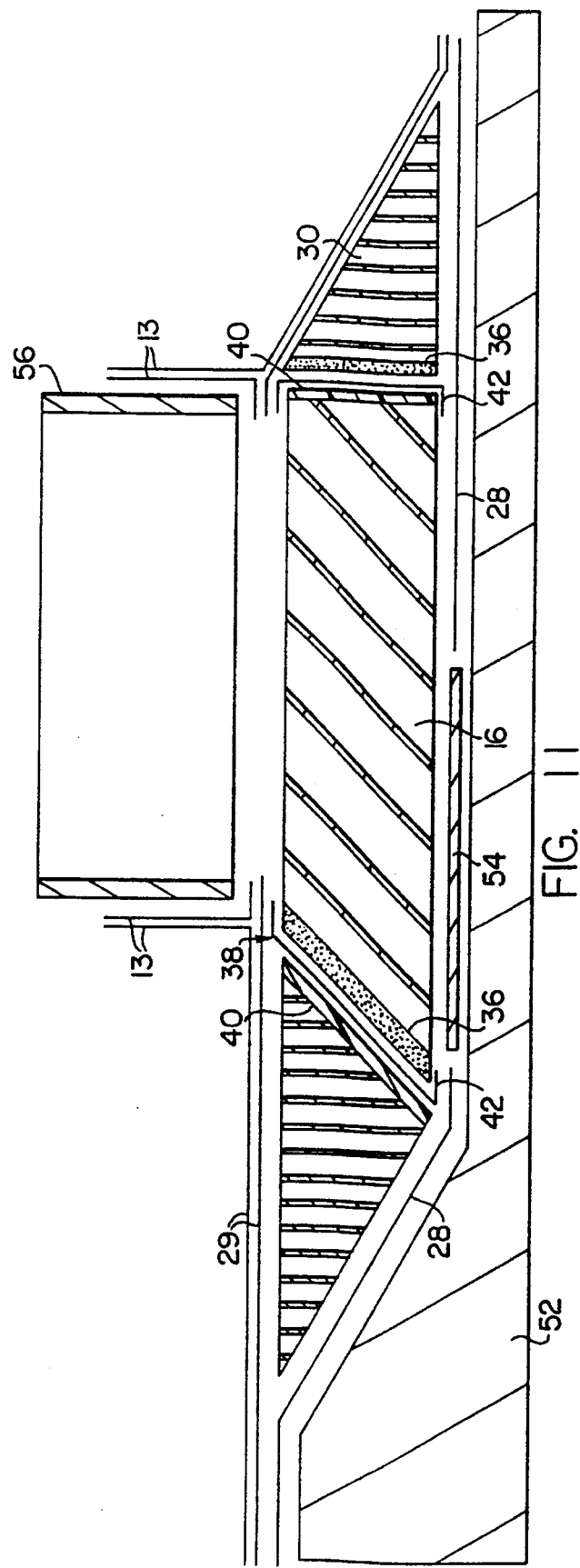
FIG. 11 illustrates a cross sectional view of a duct cover under fabrication in accordance with the method for making the present invention.

Referring to FIG. 11, the outer skin structure 28 is placed in a mold 52, the mold having a mold contour formed thereon defining the surface of the duct cover. A metallic shim 54 is placed in the region which defines the flow directing honeycomb 16. The metallic shim 54 prevents resin from the composite material from filling the open cells of the flow directing honeycomb 16 during curing. It is preferable to fabricate the shim and mold from a metal alloy having low expansion characteristics. More particularly, it is preferable to use an alloy such as INVAR® (INVAR is a trademark of Imphy, S. A., France) which has a coefficient of thermal expansion similar to that of graphite and KEVLAR. Steel and steel alloys which have coefficients of thermal expansion that are substantially dissimilar to graphite and KEVLAR are not preferable inasmuch as the divergence between expansion coefficients could result in distortion occurring during the curing process. A film adhesive layer (not shown) is placed on top of the outer skin structure 28 and the assembly is vacuum bagged and debulked.

A layer of film adhesive 40 is applied to one ply of fiber reinforced composite material 42, such as a woven KEVLAR/epoxy, to form a barrier member 38. The barrier member 38 is then disposed about the periphery of the flow directing honeycomb 16 with the composite material facing outboard. The flow directing honeycomb 16 is subsequently placed in the mold 52, on top of the outer skin structure 28.

A layer of foaming adhesive 36 is next applied to the core material 30. In order to prevent the foaming adhesive layer from expanding into open cells of the core material, a layer of film adhesive is disposed therebetween. After the foaming adhesive layer is applied to the core material 30, a second layer of film adhesive is applied to the foaming adhesive layer. The core material 30 is then placed in the mold 52 about the periphery of the flow directing honeycomb 16. A layer of film adhesive is next placed on all exposed cells of the flow directing honeycomb 16 and the core material 30.

Two plies of fiber reinforced resin matrix composite material are cut to the appropriate dimensions to form the inner skin structure 29. The plies are preferably composed of woven KEVLAR/epoxy material. The inner skin structures 29 are disposed over the core material 30 about the periphery of the exposed flow directing honeycomb 16. A mandrel 56, for use in forming the duct mounting member 13, is placed on top of the flow directing honeycomb 16 and the inner skin structures 29 are wrapped about the mandrel 56. A vacuum bag is disposed over the entire assembly and a vacuum is drawn. The assembly is then cured by exposing the same to an elevated temperature of about 350 degrees Fahrenheit and a pressure of about 25 psi for approximately two hours. After curing, the duct cover 12 is removed from the mold 52 and is attached to the exhaust duct 4.

While the method of making the preferred embodiment is disclosed hereinabove, it should be understood that the additional embodiments disclosed hereinabove would be made by similar methods. Furthermore, while the present invention has been described as a duct cover for exhausting gases, it should be understood that the invention may be used for directional control of any fluid flow and is not limited to being mounted externally.

A variety of modifications and variations of the present invention are possible in light of the above teachings. It is therefore to be understood that, within the scope of the appended claims, the present invention may be practiced otherwise than as specifically described hereinabove.

What is claimed is:

1. A duct cover operative for directing a fluid flow, the duct cover for use in combination with a duct within a vehicle, the fluid flow having an initial direction and a final direction, wherein the duct cover comprises:

a flow directing honeycomb, said honeycomb comprising an array of cells defined by an associated plurality of cell walls, said cells for conducting a fluid flow therethrough, said cells having a length sufficient for effecting a change in the fluid flow direction, and wherein said cells are biased with respect to the initial direction of the fluid flow for channeling the fluid flow from the initial direction to the final direction; and a triangular framing member for rigidizing the flow directing honeycomb, the triangular framing member including skin structures which define at least two sides of said triangular framing member, and a core material disposed between and affixed to said skin structures, wherein one side of said triangular framing member forms a peripheral side of said flow directing honeycomb.

2. The duct cover according to claim 1 wherein said bias of said cells is in a range between about 20 degrees and about 70 degrees.

3. The duct cover according to claim 2 wherein said bias of said cells is about 45 degrees.

4. The duct cover according to claim 1 wherein said core material of said triangular framing member is honeycomb, said honeycomb comprising an array of cells, and wherein said skin structures are made from a least one ply of fiber reinforced resin matrix composite material.

5. The duct cover according to claim 4 wherein said honeycomb core material of said triangular framing member is an integral extension of said flow directing honeycomb.

6. The duct cover according to claim 5 wherein said honeycomb core material of said triangular framing member has a plurality of cells filled with a stiffening material so as to further stiffen said core material.

7. The duct cover according to claim 6 wherein said stiffening material extends between said at least two skin structures so as to form a third side of the triangular framing member and wherein said stiffening material includes an epoxy resin material.

8. The duct cover according to claim 4 wherein said honeycomb core material of said triangular framing member is adhesively bonded to said flow directing honeycomb.

9. The duct cover according to claim 8 wherein said adhesive bond comprises a foaming adhesive layer and a barrier member, said barrier member for minimizing the expansion of said foaming adhesive layer.

10. The duct cover according to claim 9 wherein said barrier member is disposed between said foaming adhesive layer and said flow directing honeycomb for reducing the expansion of said foaming adhesive layer into said flow directing honeycomb cells.

11. The duct cover according to claim 9 wherein said barrier member is disposed between said foaming adhesive layer and said honeycomb core material for reducing the expansion of said foaming adhesive layer into said cells of said honeycomb core material.

12. The duct cover according to claim 9 wherein said barrier member comprises a layer of film adhesive.

13. The duct cover according to claim 9 wherein said barrier member comprises at least one ply of fiber reinforced resin matrix composite material and a layer of film adhesive, said film adhesive layer being disposed on said composite material.

14. The duct cover according to claim 4 wherein said flow directing honeycomb is made from fiberglass material and said honeycomb core material is made from a phenolic resin material.

15. The duct cover according to claim 1 wherein said flow directing honeycomb is made from fiberglass material.

16. A duct cover operative for directing a fluid flow while minimizing the reflection of electromagnetic energy, the duct cover for use in combination with a duct within a vehicle, the fluid flow having an initial direction and a final direction, wherein the duct cover comprises:
 a flow directing honeycomb, said honeycomb comprising an array of cells defined by an associated plurality of cell walls, said cells for conducting a fluid therethrough, said cells having a length sufficient for effecting a change in the fluid flow direction and being biased with respect to the initial direction of the fluid flow for channeling the fluid flow from the initial direction to the final direction, said honeycomb further including a radar absorbent material; and
 a triangular framing member for rigidizing the flow directing honeycomb, the triangular framing member including skin structures which define at least two sides of said triangular framing member, and a core material disposed between and affixed to said skin structures, wherein one side of said triangular framing member forms a peripheral side of said flow directing honeycomb.

17. The duct cover according to claim 16 wherein said radar absorbent material is disposed on said cell walls of said flow directing honeycomb.

18. The duct cover according to claim 17 wherein the thickness of said radar absorbent material varies along said cell length.

19. The duct cover according to claim 17 wherein the constituent electrical properties of said radar absorbent material vary along said cell length.

20. The duct cover according to claim 17 wherein said radar absorbent material is carbon.

21. The duct cover according to claim 16 wherein said bias of said cells is in a range between about 20 degrees and about 70 degrees.

22. The duct cover according to claim 21 wherein said bias of said cells is about 45 degrees.

23. The duct cover according to claim 16 wherein said core material of said triangular framing member is honeycomb, said honeycomb comprising an array of cells, and wherein said skin structures are made from at least one ply of fiber reinforced resin matrix composite material.

24. The duct cover according to claim 23 wherein said honeycomb core material of said triangular framing member is an integral extension of said flow directing honeycomb.

25. The duct cover according to claim 24 wherein said honeycomb core material of said triangular framing member has a plurality of cells filled with a stiffening material so as to further stiffen said core material.

26. The duct cover according to claim 25 wherein said stiffening material extends between said at least two skin structures so as to form a third side of the triangular framing member and wherein said stiffening material includes an epoxy resin material.

27. The duct cover according to claim 23 wherein said honeycomb core material of said triangular framing member is adhesively bonded to said flow directing honeycomb.

28. The duct cover according to claim 27 wherein said adhesive bond comprises a foaming adhesive layer and a barrier member, said barrier member for minimizing the expansion of said foaming adhesive layer.

29. The duct cover according to claim 28 wherein said barrier member is disposed between said foaming adhesive layer and said flow directing honeycomb for reducing the expansion of said foaming adhesive layer into said flow directing honeycomb cells.

30. The duct cover according to claim 28 wherein said barrier member is disposed between said foaming adhesive layer and said honeycomb core material for reducing the expansion of said foaming adhesive layer into said cells of said honeycomb core material.

31. The duct cover according to claim 28 wherein said barrier member comprises a layer of film adhesive.

32. The duct cover according to claim 28 wherein said barrier member comprises at least one ply of fiber reinforced resin matrix composite material and a layer of film adhesive, said film adhesive layer being disposed on said composite material.

33. The duct cover according to claim 32 wherein said fibers of said composite material are made from an aromatic polyamide material.

34. The duct cover according to claim 23 wherein said flow directing honeycomb is made from fiberglass material and said honeycomb core material is made from a phenolic resin material.

35. The duct cover according to claim 23 wherein said fibers of said skin structures are made from an aromatic polyamide material.

36. The duct cover according to claim 16 wherein said flow directing honeycomb is made from fiberglass material.

* * * * *